United States Patent
Zhang et al.

(10) Patent No.: US 11,721,219 B2
(45) Date of Patent: Aug. 8, 2023

(54) METHOD FOR CONTROLLING STEADY FLIGHT OF UNMANNED AIRCRAFT

(71) Applicant: South China University of Technology, Guangzhou (CN)

(72) Inventors: Zhijun Zhang, Guangzhou (CN); Lu'nan Zheng, Guangzhou (CN); Dongyu Ji, Guangzhou (CN)

(73) Assignee: South China University of Technology, Guangzhou (CN)

( * ) Notice: Subject to any disclaimer, the term of this patent is extended or adjusted under 35 U.S.C. 154(b) by 442 days.

(21) Appl. No.: 16/652,457

(22) PCT Filed: Oct. 26, 2018

(86) PCT No.: PCT/CN2018/112114
§ 371 (c)(1),
(2) Date: Aug. 31, 2021

(87) PCT Pub. No.: WO2019/085834
PCT Pub. Date: May 9, 2019

(65) Prior Publication Data
US 2022/0036739 A1    Feb. 3, 2022

(30) Foreign Application Priority Data

Nov. 1, 2017   (CN) .......................... 201711059466.9

(51) Int. Cl.
*G08G 5/00*    (2006.01)
*B64C 39/02*   (2023.01)
(Continued)

(52) U.S. Cl.
CPC ........... *G08G 5/003* (2013.01); *B64C 39/024* (2013.01); *G05D 1/0088* (2013.01);
(Continued)

(58) Field of Classification Search
CPC .... G08G 5/003; B64C 39/024; G05D 1/0816; G05D 1/0088; G05D 1/0858; G05D 1/101;
(Continued)

(56) References Cited

U.S. PATENT DOCUMENTS 6,092,919 A    7/2000   Calise

FOREIGN PATENT DOCUMENTS

CN    104932512 A    9/2015
CN    105676641 A    6/2016
(Continued)

OTHER PUBLICATIONS

Zhang et al.; A New Neural-Dynamic Control Method of Position and Angular Stabilization for Autonomous Quadrotor UAVs; 2016 IEEE Intl. Conf. on Fuzzy Systems (FUZZ); p. 850-855 (Year: 2016).*

(Continued)

*Primary Examiner* — Michael J Zanelli
(74) *Attorney, Agent, or Firm* — The Dobrusin Law Firm, PC (57) ABSTRACT

Disclosed is a method for controlling stable flight of an unmanned aircraft, comprising the following steps: acquiring real-time flight operation data of the aircraft itself by means of an attitude sensor, a position sensor and an altitude sensor mounted to the unmanned aircraft, performing corresponding analysis on a kinematic problem of the aircraft by a processor mounted thereto, and establishing a dynamics model of the aircraft (S1); designing a controller of the unmanned aircraft according to a multi-layer zeroing neurodynamic method (S2); solving output control quantities of motors of the aircraft by the designed multi-layer zeroing neural network controller using the acquired real-time operation data of the aircraft and target attitude data (S3);

(Continued)

and transferring solution results to a motor governor of the aircraft, and controlling powers of the motors according to a relationship between the control quantities solved by the controller and the powers of the motors of the multi-rotor unmanned aircraft, so as to control the motion of the unmanned aircraft (S4). Based on the multi-layer zeroing neurodynamic method, a correct solution to the problem can be approached rapidly, accurately and in real time, and a time-varying problem can be significantly solved.

9 Claims, 3 Drawing Sheets

(51) Int. Cl.
*G05D 1/08* (2006.01)
*G05D 1/00* (2006.01)
*B64U 30/20* (2023.01)
*B64U 101/00* (2023.01)

(52) U.S. Cl.
CPC .......... *G05D 1/0816* (2013.01); *B64U 30/20* (2023.01); *B64U 2101/00* (2023.01)

(58) Field of Classification Search
CPC . B64U 30/20; B64U 2101/00; B64U 2201/10
See application file for complete search history.

(56) References Cited

FOREIGN PATENT DOCUMENTS

| | | | |
|---|---|---|---|
| CN | 106155076 | A | 11/2016 |
| CN | 106444809 | A | 2/2017 |
| CN | 106502262 | A | 3/2017 |
| CN | 106647781 | * | 5/2017 |
| CN | 107264804 | A | 10/2017 |
| WO | WO-2015180171 | A1 * | 12/2015 ............. B64C 15/00 |

OTHER PUBLICATIONS

Zhang et al; Stabilization of Three Time-Varying Linear Systems Using ZG Method with Pseudo Division-by-Zero Phenomena Displayed; 2017 4th International Conference on Systems and Informatics (ICSAI 2017); IEEE; pp. 72-77 (Year: 2017).*

Zengqiang, Control System Design Based on Integral Sliding Mode of Quadrotor, China Academic Electronic Publishing House, Sep. 2015.

Li, Modeling and PID Control for a Quadrotor, China Academic Journal Electronic Publishing House, Feb. 2012.

* cited by examiner

METHOD FOR CONTROLLING STEADY FLIGHT OF UNMANNED AIRCRAFT

TECHNICAL FIELD

The present invention relates to a flight control method, in particular to a method for controlling stable flight of an unmanned aircraft.

BACKGROUND ART

In recent years, the world's unmanned aircraft technology has developed rapidly. Multi-rotor aircrafts with vertical takeoff and landing, stable hovering, wireless transmission, long-range aerial photography and autonomous cruising capabilities have broad application prospects in military and civil fields. Due to the characteristics of excellent maneuverability, simple mechanical structure, easy deployment and easy maintenance, the small rotor-type aircrafts are widely used in the fields of aerial photography, power inspection, environmental monitoring, forest fire prevention, disaster inspection, anti-terrorism rescue, military reconnaissance, battlefield assessment, etc. With wide application of unmanned aircrafts, the design of stable and fast-responding controllers of the unmanned aircrafts has attracted the attention of many researchers. The conventional controllers of the unmanned aircrafts are all designed on the basis of PID closed-loop control algorithms and corresponding improved control algorithms. PID controllers and feedback closed-loop control systems, which are simple in design and have good control effects, have been widely used in the design of the controllers of the aircrafts. Although the PID controllers are easy to use, the PID controllers and the power allocation schemes obtained according to the PID controllers do not achieve the desired stability of the unmanned aircrafts.

SUMMARY OF THE INVENTION

An object of the present invention is, in order to overcome the deficiencies of the prior art, to provide a method for designing a stable flight controller and a power allocation scheme, which controls stable flight of an unmanned aircraft by acquiring real-time flight operation data of the aircraft by using a sensor, solving output control quantities of motors of the aircraft by means of a multi-layer zeroing neural network, and obtaining a corresponding power allocation scheme.

The object of the present invention is achieved by means of the following technical solution:

a method for controlling stable flight of an unmanned aircraft, comprising the steps of:

1) acquiring real-time flight operation data of the aircraft itself, analyzing a kinematic problem of the aircraft, and establishing a dynamics model of the aircraft;

2) constructing a deviation function according to the real-time flight operation data acquired in step 1) and target attitude data, and constructing neurodynamic equations based on the deviation function by using a multi-layer zeroing neurodynamic method, wherein the neurodynamic equations based on the deviation function corresponding to all parameters together constitute a controller of the unmanned aircraft, and output quantities solved from differential equations of the controller are output control quantities of motors of the aircraft; and 3) controlling powers of the motors according to a relationship between the output control quantities solved in step 2) and the powers of the motors of the multi-rotor unmanned aircraft to complete motion control over the unmanned aircraft, specifically:

according to a power allocation scheme for the unmanned aircraft, the control quantities solved by the controller have the following relationship with the powers of the motors of the multi-rotor unmanned aircraft:

$$U = WF$$

where $U=[u_1\ u_2\ u_3\ u_4]^T$ refers to the output control quantities of the unmanned aircraft, $F=[F_1\ \ldots\ F_j]^T$ refers to the powers of the motors of the unmanned aircraft, j is the number of the motors of the multi-rotor unmanned aircraft, W is a power allocation matrix of the unmanned aircraft, and the matrix W has different forms depending on different structures and the number of rotors, and needs to be determined according to the structure thereof and the number of the rotors;

the corresponding powers F of the motors are obtained by means of matrix inversion or pseudo-inversion, i.e.:

$$F = W^{-1} U$$

if the matrix W is a square matrix and is reversible, $W^{-1}$ is obtained by means of an inverse operation, and if W is not a square matrix, $W^{-1}$ is solved by means of a corresponding pseudo-inverse operation; and the desired powers F of the motors are finally obtained, input voltages of the motors are controlled according to a relationship between the voltages and powers of the motors to control the rotational speeds of the motors, and the control over the powers of the motors is finally realized to complete stable flight control over the unmanned aircraft.

Further, the step of performing corresponding analysis on a kinematic problem of the aircraft by a processor mounted thereto specifically comprises:

defining a ground coordinate system E and a fuselage coordinate system B, and establishing a relationship E=RB between the ground coordinate system and the fuselage coordinate system by means of a transformation matrix R, where R may be expressed as $$R = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

where $\phi$ is a roll angle, $\theta$ is a pitch angle, and $\psi$ is a yaw angle;

ignoring the effect of an air resistance on the aircraft, the stress analysis (in the form of Newton-Euler) of the aircraft system in the fuselage coordinate system is as follows $$\begin{bmatrix} mI_{3\times3} & 0 \\ 0 & I \end{bmatrix} \begin{bmatrix} \dot{V} \\ \dot{\omega} \end{bmatrix} + \begin{bmatrix} \omega \times mV \\ \omega \times I\omega \end{bmatrix} = \begin{bmatrix} F \\ \tau \end{bmatrix}$$

where m is the total mass of the aircraft, $I_{3\times3}$ is a unit matrix, I is an inertia matrix, V is a linear velocity in the fuselage coordinate system, $\omega$ is an angular velocity in the fuselage coordinate system, F is a resultant external force, and $\tau$ is a resultant torque.

Further, the step of establishing a dynamics model of the aircraft specifically comprises:

according to the defined ground coordinate system E and fuselage coordinate system B, the relationship E=RB established between the two by means of the transformation matrix R and the stress analysis of the aircraft system in the fuselage coordinate system, obtaining dynamics equations of the multi-rotor aircraft as follows $$\begin{cases} \ddot{x} = \dfrac{u_x u_1}{m} \\ \ddot{y} = \dfrac{u_y u_1}{m} \\ \ddot{z} = -g + \dfrac{(\cos\phi \cos\theta)u_1}{m} \\ \ddot{\phi} = \dfrac{(I_y - I_z)\dot{\theta}\dot{\psi} + lu_2}{I_x} \\ \ddot{\theta} = \dfrac{(I_z - I_x)\dot{\psi}\dot{\phi} + lu_3}{I_y} \\ \ddot{\psi} = \dfrac{(I_x - I_y)\dot{\phi}\dot{\theta} + u_4}{I_z} \end{cases}$$

where $l$ is an arm length; $g$ is a gravitational acceleration; $x, y, z$ are respectively position coordinates of the aircraft in the ground coordinate system; $I_x$, $I_y$, $I_z$ are respectively rotational inertia of the aircraft in X, Y and Z axes; $u_x$=cos $\phi$ sin $\theta$ cos $\psi$+sin $\phi$ sin $\psi$; $u_y$=cos $\phi$ sin $\theta$ sin $\psi$−sin $\phi$ cos $\psi$; and $u_1$, $u_2$, $u_3$, $u_4$ are output control quantities.

Further, the step of designing a controller of the unmanned aircraft specifically comprises the steps of:

(1) designing a deviation function regarding the output control quantity $u_1$ from the vertical altitude $z$ by means of the multi-layer zeroing neurodynamic method, and designing an altitude controller for the unmanned aircraft according to this deviation function;

(2) designing a deviation function regarding $u_x$ and $u_y$ from the horizontal positions $x$ and $y$ by means of the multi-layer zeroing neurodynamic method, designing a position controller for the unmanned aircraft according to this deviation function, and then inversely solving target attitude angles $\phi_T$ and $\theta_T$; and (3) designing a deviation function regarding the output control quantities $u_2 \sim u_4$ from the roll angle $\phi$, the pitch angle $\theta$ and the yaw angle $\psi$ by means of the multi-layer zeroing neurodynamic method, and designing an attitude controller according to this deviation function.

Further, the step of designing a deviation function regarding the output control quantity $u_1$ and a corresponding altitude controller of the unmanned aircraft specifically consists in that:

for the vertical altitude $z$, according to the target altitude value $z_T$ and the actual altitude value $z$ in the Z axis, a deviation function may be defined as $$e_{z1} = z - z_T \tag{1}$$

and its derivative may be obtained as follows $$\dot{e}_{z1} = \dot{z} - \dot{z}_T \tag{2}$$

in order to converge the actual value $z$ to the target value $z_T$, according to the multi-layer zeroing neurodynamic method, a neurodynamic equation based on the deviation function may be designed as $$\dot{e}_{z1} = -\gamma e_{z1} \tag{3}$$

where $\gamma$ is a constant;

equations (1) and (2) are substituted into equation (3) and collating is performed to obtain $$\dot{z} - \dot{z}_T + \gamma(z - z_T) = 0 \tag{4}$$

since equation (4) is generally not established in the initial situation and does not contain relevant information of the output control quantities, and the control quantities cannot be solved, a further design is needed, and a definition is then made $$e_{z2} = \dot{z} - \dot{z}_T + \gamma(z - z_T) \tag{5}$$

and its derivative may be obtained as follows $$\dot{e}_{z2} = \ddot{z} - \ddot{z}_T + \gamma(\dot{z} - \dot{z}_T) \tag{6}$$

according to the multi-layer zeroing neurodynamic method, a neurodynamic equation based on the deviation function may be designed as $$\dot{e}_{z2} = -\gamma e_{z2} \tag{7}$$

equations (5) and (6) are substituted into equation (7) and collating is performed to obtain $$\ddot{z} - \ddot{z}_T + 2\gamma(\dot{z} - \dot{z}_T) + \gamma^2(z - z_T) = 0 \tag{8}$$

in this way, a deviation function may be defined as $$E_z = \ddot{z} - \ddot{z}_T + 2\gamma(\dot{z} - \dot{z}_T) + \gamma^2(z - z_T) \tag{9}$$

according to the dynamics equations of the aircraft, (9) may be simplified into $$E_z = a_z u_1 + b_z \tag{10}$$

where $$a_z = \dfrac{\cos\phi \cos\theta}{m},$$

and $b_z = -g - \ddot{z}_T + 2\gamma(\dot{z} - \dot{z}_T) + \gamma^2(z - z_T)$; and its derivative may be obtained as follows $$\dot{E}_z = a_z \dot{u}_1 + \dot{a}_z u_1 + \dot{b}_z \tag{11}$$

it is possible to use the multi-layer zeroing neurodynamic method to design $$\dot{E}_z = -\gamma E_z \tag{12}$$

equations (10) and (11) are substituted into equation (12) and collating is performed to obtain $$a_z \dot{u}_1 = -\gamma(a_z u_1 + b_z) - \dot{b}_z - \dot{a}_z u_1 \tag{13}$$

Further, the step of designing a deviation function regarding $u_x$ and $u_y$ and a corresponding position controller for the unmanned aircraft specifically consists in that:

for the horizontal position $x$, according to the target value $x_T$ and the actual value $x$ in the X axis, a deviation function may be defined as $$e_{x1} = x - x_T \tag{14}$$

and its derivative may be obtained as follows $$\dot{e}_{x1} = \dot{x} - \dot{x}_T \tag{15}$$

in order to converge the actual value $x$ to the target value $x_T$, according to the multi-layer zeroing neurodynamic method, a neurodynamic equation based on the deviation function may be designed as $$\dot{e}_{x1} = -\gamma e_{x1} \tag{16}$$

equations (14) and (15) are substituted into equation (16) and collating is performed to obtain $$\dot{x} - \dot{x}_T + \gamma(x - x_T) = 0 \tag{17}$$

since equation (17) is generally not established in the initial situation and does not contain relevant information of the output control quantities, and the control quantities cannot be solved, a further design is needed, and a definition is then made $$e_{x2} = \dot{x} - \dot{x}_T + \gamma(x - x_T) \quad (18)$$

and its derivative may be obtained as follows $$\dot{e}_{x2} = \ddot{x} - \ddot{x}_T + \gamma(\dot{x} - \dot{x}_T) \quad (19)$$

according to the multi-layer zeroing neurodynamic method, a neurodynamic equation based on the deviation function may be designed as $$\dot{e}_{x2} = -\gamma e_{x2} \quad (20)$$

equations (18) and (19) are substituted into equation (20) and collating is performed to obtain $$\ddot{x} - \ddot{x}_T + 2\gamma(\dot{x} - \dot{x}_T) + \gamma^2(x - x_T) = 0 \quad (21)$$

in this way, a deviation function may be defined as $$E_x = \ddot{x} - \ddot{x}_T + 2\gamma(\dot{x} - \dot{x}_T) + \gamma^2(x - x_T) \quad (22)$$

according to the dynamics equations of the aircraft, equation (22) may be simplified into $$E_x = a_x u_x + b_x \quad (23)$$

where $$a_x = \frac{u_1}{m},$$

and $b_x = -\ddot{x}_T + 2\gamma(\dot{x} - \dot{x}_T) + \gamma^2(x - x_T)$; and its derivative may be obtained as follows $$\dot{E}_x = a_x \dot{u}_x + \dot{a}_x u_x + \dot{b}_x \quad (24)$$

it is possible to use the multi-layer zeroing neurodynamic method to design $$\dot{E}_x = -\gamma E_x \quad (25)$$

equations (23) and (24) are substituted into equation (25) and collating is performed to obtain $$a_x \dot{u}_x = -\gamma(a_x u_x + b_x) - \dot{b}_x - \dot{a}_x u_x \quad (26)$$

for the horizontal position y, according to the target value $y_T$ and the actual value y in the Y axis, a deviation function may be defined as $$e_{y1} = y - y_T \quad (27)$$

and its derivative may be obtained as follows $$\dot{e}_{y1} = \dot{y} - \dot{y}_T \quad (28)$$

in order to converge the actual value y to the target value $y_T$, according to the multi-layer zeroing neurodynamic method, a neurodynamic equation based on the deviation function may be designed as $$\dot{e}_{y1} = -\gamma e_{y1} \quad (29)$$

equations (27) and (28) are substituted into equation (29) and collating is performed to obtain $$\dot{y} - \dot{y}_T + \gamma(y - y_T) = 0 \quad (30)$$

since equation (30) is generally not established in the initial situation and does not contain relevant information of the output control quantities, and the control quantities cannot be solved, a further design is needed, and a definition is then made $$e_{y2} = \dot{y} - \dot{y}_T + \gamma(y - y_T) \quad (31)$$

and its derivative may be obtained as follows $$\dot{e}_{y2} = \ddot{y} - \ddot{y}_T + \gamma(\dot{y} - \dot{y}_T) \quad (32)$$

according to the multi-layer zeroing neurodynamic method, a neurodynamic equation based on the deviation function may be designed as $$\dot{e}_{y2} = -\gamma e_{y2} \quad (33)$$

equations (31) and (32) are substituted into equation (33) and collating is performed to obtain $$\ddot{y} - \ddot{y}_T + 2\gamma(\dot{y} - \dot{y}_T) + \gamma^2(y - y_T) = 0 \quad (34)$$

in this way, a deviation function may be defined as $$E_y = \ddot{y} - \ddot{y}_T + 2\gamma(\dot{y} - \dot{y}_T) + \gamma^2(y - y_T) \quad (35)$$

according to the dynamics equations of the aircraft, equation (35) may be simplified into $$E_y = a_y u_y + b_y \quad (36)$$

where $$a_y = \frac{u_1}{m},$$

and $b_y = -\ddot{y}_T + 2\gamma(\dot{y} - \dot{y}_T) + \gamma^2(y - y_T)$; and its derivative may be obtained as follows $$\dot{E}_y = a_y \dot{u}_y + \dot{a}_y u_y + \dot{b}_y \quad (37)$$

it is possible to use the multi-layer zeroing neurodynamic method to design $$\dot{E}_y = -\gamma E_y \quad (38)$$

equations (36) and (37) are substituted into equation (38) and collating is performed to obtain $$a_y \dot{u}_y = -\gamma(a_y u_y + b_y) - \dot{b}_y - \dot{a}_y u_y \quad (39).$$

Further, according to the designed position controller, the calculation method of inversely solving the target attitude angles $\phi_T$ and $\theta_T$ is:

$u_x$ and $u_y$ solved from equations (26) and (39) are $$\begin{cases} u_x = \cos\phi \sin\theta \cos\psi + \sin\phi \sin\psi \\ u_y = \cos\phi \sin\theta \sin\psi - \sin\phi \cos\psi \end{cases}$$

so that the inversely solved target angle values $\phi_T$ and $\theta_T$ are $$\begin{cases} \phi_T = \sin^{-1}(u_x \sin\psi - u_y \cos\psi) \\ \theta_T = \sin^{-1}\left(\dfrac{u_x - \sin\phi_T \sin\psi}{\cos\phi_T \cos\psi}\right) \end{cases} \quad (40)$$

Further, the step of designing a deviation function regarding the output control quantity $u_2 \sim u_4$ and a corresponding attitude controller of the unmanned aircraft specifically consists in that:

for the roll angle $\phi$, according to the target angle $\phi_T$ solved in (40) and the actual angle $\phi$, a deviation function may be defined as $$e_{\phi 1} = \phi - \phi_T \quad (41)$$

and its derivative may be obtained as follows $$\dot{e}_{\phi 1} = \dot{\phi} - \dot{\phi}_T \quad (42)$$

in order to converge the actual value $\phi$ to the target value $\phi_T$, according to the multi-layer zeroing neurodynamic method, a neurodynamic equation based on the deviation function may be designed as $$\dot{e}_{\phi 1}=-\gamma e_{\phi 1} \quad (43)$$

equations (41) and (42) are substituted into equation (43) and collating is performed to obtain $$\dot{\phi}-\dot{\phi}_T+\gamma(\phi-\phi_T)=0 \quad (44)$$

since equation (44) is generally not established in the initial situation and does not contain relevant information of the output control quantities, and the control quantities cannot be solved, a further design is needed, and a definition is then made $$e_{\phi 2}=\dot{\phi}-\dot{\phi}_T+\gamma(\phi-\phi_T) \quad (45)$$

and its derivative may be obtained as follows $$\dot{e}_{\phi 2}=\ddot{\phi}-\ddot{\phi}_T+\gamma(\dot{\phi}-\dot{\phi}_T) \quad (46)$$

according to the multi-layer zeroing neurodynamic method, a neurodynamic equation based on the deviation function may be designed as $$\dot{e}_{\phi 2}=-\gamma e_{\phi 2} \quad (47)$$

equations (45) and (46) are substituted into equation (47) and collating is performed to obtain $$\ddot{\phi}-\ddot{\phi}_T+2\gamma(\dot{\phi}-\dot{\phi}_T)+\gamma^2(\phi-\phi_T)=0 \quad (48)$$

in this way, a deviation function may be defined as $$E_\phi=\ddot{\phi}-\ddot{\phi}_T+2\gamma(\dot{\phi}-\dot{\phi}_T)+\gamma^2(\phi-\phi_T) \quad (49)$$

according to the dynamics equations of the aircraft, equation (49) may be simplified into $$E_\phi=a_\phi u_2+b_\phi \quad (50)$$

where $$a_\phi=\frac{l}{I_x}, \text{ and } b_\phi=\frac{(I_y-I_z)\dot{\theta}\dot{\psi}}{I_x}-\ddot{\phi}_T+2\gamma(\dot{\phi}-\dot{\phi}_T)+\gamma^2(\phi-\phi_T);$$

and its derivative may be obtained as follows $$\dot{E}_\phi=a_\phi \dot{u}_2+\dot{a}_\phi u_2+\dot{b}_\phi \quad (51)$$

according to the multi-layer zeroing neurodynamic method, it is possible to design $$\dot{E}_\phi=\gamma E_\phi \quad (52)$$

equations (50) and (51) are substituted into equation (52) and collating is performed to obtain $$a_\phi \dot{u}_2=-\gamma(a_\phi u_2+b_\phi)-\dot{b}_\phi-\dot{a}_\phi u_2 \quad (53)$$

for the pitch angle $\theta$, according to the target angle $\theta_T$ solved in (40) and the actual angle $\theta$, a deviation function may be defined as $$e_{\theta 1}=\theta-\theta_T \quad (54)$$

and its derivative may be obtained as follows $$\dot{e}_{\theta 1}=\dot{\theta}-\dot{\theta}_T \quad (55)$$

in order to converge the actual value $\theta$ to the target value $\theta_T$, according to the multi-layer zeroing neurodynamic method, a neurodynamic equation based on the deviation function may be designed as $$\dot{e}_{\theta 1}=-\gamma e_{\theta 1} \quad (56)$$

equations (54) and (55) are substituted into equation (56) and collating is performed to obtain $$\dot{\theta}-\dot{\theta}_T+\gamma(\theta-\theta_T)=0 \quad (57)$$

since equation (57) is generally not established in the initial situation and does not contain relevant information of the output control quantities, and the control quantities cannot be solved, a further design is needed, and a definition is then made $$e_{\theta 2}=\dot{\theta}-\dot{\theta}_T+\gamma(\theta-\theta_T) \quad (58)$$

and its derivative may be obtained as follows $$\dot{e}_{\theta 2}=\ddot{\theta}-\ddot{\theta}_T+\gamma(\dot{\theta}-\dot{\theta}_T) \quad (59)$$

according to the multi-layer zeroing neurodynamic method, a neurodynamic equation based on the deviation function may be designed as $$\dot{e}_{\theta 2}=-\gamma e_{\theta 2} \quad (60)$$

equations (58) and (59) are substituted into equation (60) and collating is performed to obtain $$\ddot{\theta}-\ddot{\theta}_T+2\gamma(\dot{\theta}-\dot{\theta}_T)+\gamma^2(\theta-\theta_T)=0 \quad (61)$$

in this way, a deviation function may be defined as $$E_\theta=\ddot{\theta}-\ddot{\theta}_T+2\gamma(\dot{\theta}-\dot{\theta}_T)+\gamma^2(\theta-\theta_T) \quad (62)$$

according to the dynamics equations of the aircraft, equation (62) may be simplified into $$E_\theta=a_\theta u_3+b_\theta \quad (63)$$

where $$a_\theta=\frac{l}{I_y}, \text{ and } b_\theta=\frac{(I_z-I_x)\dot{\phi}\dot{\psi}}{I_y}-\ddot{\theta}_T+2\gamma(\dot{\theta}-\dot{\theta}_T)+\gamma^2(\theta-\theta_T);$$

and its derivative may be obtained as follows $$\dot{E}_\theta=a_\theta \dot{u}_3+\dot{b}_\theta \quad (64)$$

according to the multi-layer zeroing neurodynamic method, it is possible to design $$\dot{E}_\theta=-\gamma E_\theta \quad (65)$$

equations (63) and (64) are substituted into equation (65) and collating is performed to obtain $$a_\theta \dot{u}_3=-\gamma(a_\theta u_3+b_\theta)-\dot{b}_\theta-\dot{a}_\theta u_3 \quad (66)$$

for the yaw angle $\psi$, according to an artificially set angle $\psi_T$ and the actual angle $\psi$, a deviation function may be defined as $$e_{\psi 1}=\psi-\psi_T \quad (67)$$

and its derivative may be obtained as follows $$\dot{e}_{\psi 1}=\dot{\psi}-\dot{\psi}_T \quad (68)$$

in order to converge the actual value $\psi$ to the target value $\psi_T$, according to the multi-layer zeroing neurodynamic method, a neurodynamic equation based on the deviation function may be designed as $$\dot{e}_{\psi 1}=-\gamma e_{\psi 1} \quad (69)$$

equations (67) and (68) are substituted into equation (69) and collating is performed to obtain $$\dot{\psi}-\dot{\psi}_T+\gamma(\psi-\psi_T)=0 \quad (70)$$

since equation (70) is generally not established in the initial situation and does not contain relevant information of the output control quantities, and the control quantities cannot be solved, a further design is needed, and a definition is then made $$e_{\psi 2}=\dot{\psi}-\dot{\psi}_T+\gamma(\psi-\psi_T) \quad (71)$$

and its derivative may be obtained as follows $$\dot{e}_{\psi 2}=\dot{\psi}-\dot{\psi}_T+\gamma(\psi-\psi_T) \quad (72)$$

according to the multi-layer zeroing neurodynamic method, a neurodynamic equation based on the deviation function may be designed as $$\dot{e}_{\psi 2}=-\gamma e_{\psi 2} \quad (73)$$

equations (71) and (72) are substituted into equation (73) and collating is performed to obtain $$\ddot{\psi}-\ddot{\psi}_T+2\gamma(\dot{\psi}-\dot{\psi}_T)+\gamma^2(\psi-\psi_T)=0 \quad (74)$$

in this way, a deviation function may be defined as $$E_\psi=\ddot{\psi}-\ddot{\psi}_T+2\gamma(\dot{\psi}-\dot{\psi}_T)+\gamma^2(\psi-\psi_T) \quad (75)$$

according to the dynamics equations of the aircraft, equation (75) may be simplified into $$E_\psi=a_\psi u_4+b_\psi \quad (76)$$

where $$a_\psi=\frac{1}{I_z},\text{ and }b_\psi=\frac{(I_x-I_y)\dot{\phi}\dot{\theta}}{I_z}-\ddot{\psi}_T+2\gamma(\dot{\psi}-\dot{\psi}_T)+\gamma^2(\psi-\psi_T);$$

and its derivative may be obtained as follows $$\dot{E}_\psi=a_\psi\dot{u}_4+\dot{a}_\psi u_4+\dot{b}_\psi \quad (77)$$

according to the multi-layer zeroing neurodynamic method, it is possible to design $$\dot{E}_\psi=-\gamma E_\psi \quad (78)$$

equations (76) and (77) are substituted into equation (78) and collating is performed to obtain $$a_\psi \dot{u}_4=-\gamma(a_\psi u_4+b_\psi)-\dot{b}_\psi-\dot{a}_\psi u_4 \quad (79).$$

Further, the step in which the altitude controller designed according to the altitude variable z, the position controller designed according to the position variables x and y, and the attitude controller designed according to the attitude control quantities ϕ, θ and ψ together constitute a stable flight controller of the multi-rotor unmanned aircraft specifically consists in that:

a controller of the unmanned aircraft may be obtained according to equations (13), (53), (66) and (79), wherein the controller can be implemented by a network structure; the controller of the unmanned aircraft is capable of controlling the stable flight of the unmanned aircraft; and the controller may be written in the following form:

$$\begin{cases} \dot{u}_1=\dfrac{-\gamma(a_z u_1+b_z)-\dot{b}_z-\dot{a}_z u_1}{a_z} \\ \dot{u}_2=\dfrac{-\gamma(a_\phi u_2+b_\phi)-\dot{b}_\phi-\dot{a}_\phi u_2}{a_\phi} \\ \dot{u}_3=\dfrac{-\gamma(a_\theta u_3+b_\theta)-\dot{b}_\theta-\dot{a}_\theta u_3}{a_\theta} \\ \dot{u}_4=\dfrac{-\gamma(a_\psi u_4+b_\psi)-\dot{b}_\psi-\dot{a}_\psi u_4}{a_\psi} \end{cases}$$

a zeroing neural network is constructed from the differential equations of the controller, and the control quantities of the unmanned aircraft are solved by means of the zeroing neural network.

Compared with the prior art, the present invention has the following beneficial effects:

1. The multi-layer zeroing neural network has better convergence characteristics, can realize real-time response of the aircraft and has a strong robustness, and the controller system designed according to the neural network is stable and has a good control effect.

2. The present invention is based on the multi-layer zeroing neurodynamic method, the method is described by using a ubiquitous implicit dynamics model, derivative information of various time-varying parameters can be fully utilized from the method and system level, and the method has a certain predictive ability for solving problems, can quickly, accurately and timely approach correct solutions of the problems, and can solve a variety of time-varying problems such as matrices, vectors, algebras and optimization.

DETAILED DESCRIPTION OF EMBODIMENTS

Hereafter the present invention will be further described in detail in conjunction with embodiments and appended drawings, but the embodiments of the present invention are not limited thereto.

Embodiment

Figure 1:
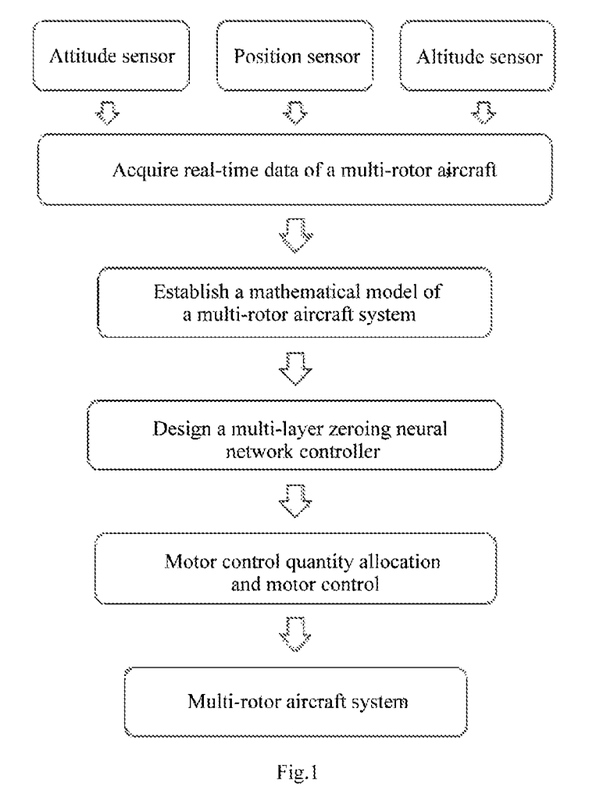
FIG. 1 is a flow chart of a method for controlling stable flight of a multi-rotor aircraft according to an embodiment of the present invention.
Figure 2:
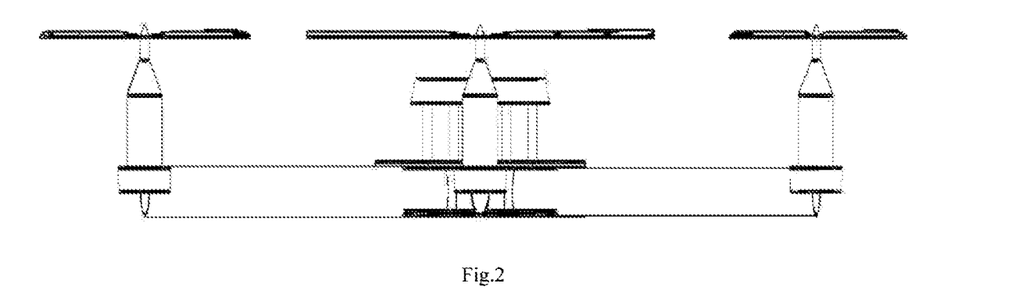
FIG. 2 is a side view showing the structure of the multi-rotor aircraft according to the present invention.
Figure 3:
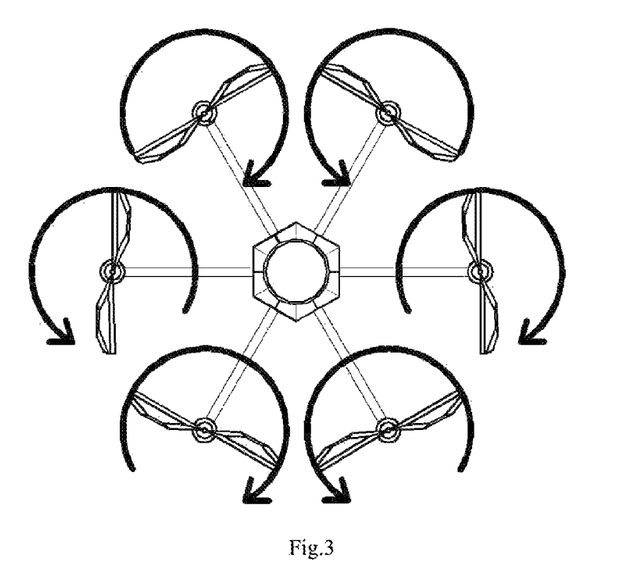
FIG. 3 is a top view showing the structure of the multi-rotor aircraft according to the present invention.
Figure 4:
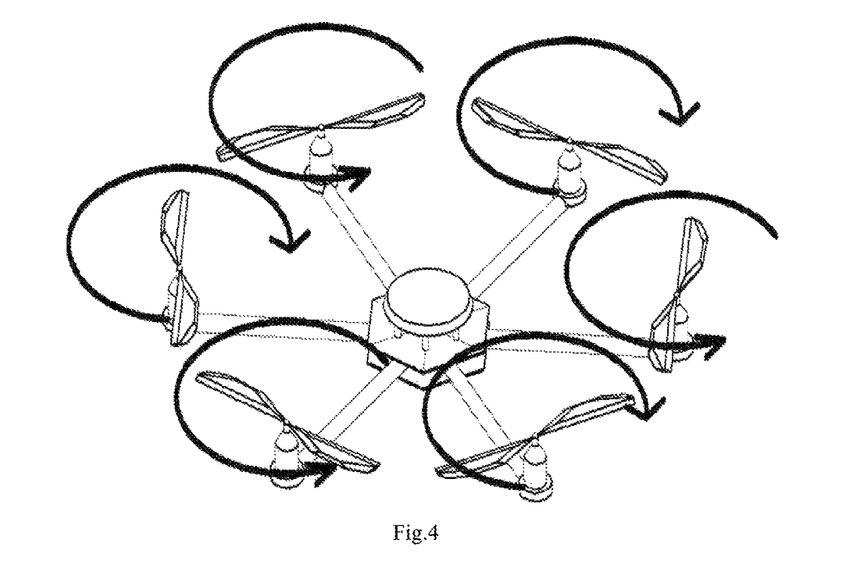
FIG. 4 is a three-dimensional view showing the structure of the multi-rotor aircraft according to the present invention.

As shown in FIG. 1, the present embodiment provides a method for controlling stable flight of an unmanned aircraft. The method comprises the following steps:

S1: acquiring real-time flight operation data of the aircraft itself by means of an attitude sensor, a position sensor and an altitude sensor mounted to the unmanned aircraft, performing corresponding analysis on a kinematic problem of the aircraft by a processor mounted thereto, and establishing a dynamics model of the aircraft;

One type of rotor flight structure in the multi-rotor aircraft is shown in FIGS. 2, 3 and 4. The structure is a six-rotor aircraft mechanism model consisting of multi-rotor aircraft propellers, brushless motors, rotor arms and a fuselage. Arrows in FIGS. 3 and 4 indicate the directions of rotation of the motors, and the combination of the illustrated clockwise and counterclockwise directions of rotation is to achieve mutual offsetting of torques the motors so as to achieve stable steering control.

Real-time attitude data θ(t), ϕ(t) and ψ(t) of the aircraft may be acquired by sensors such as gyros and accelerometers mounted to the multi-rotor aircraft by means of quaternion algebra, Kalman filtering and other algorithms, and position data x(t), y(t) and z(t) of the aircraft in the three-dimensional space is acquired by using altitude sensors and position sensors.

Figure 5:
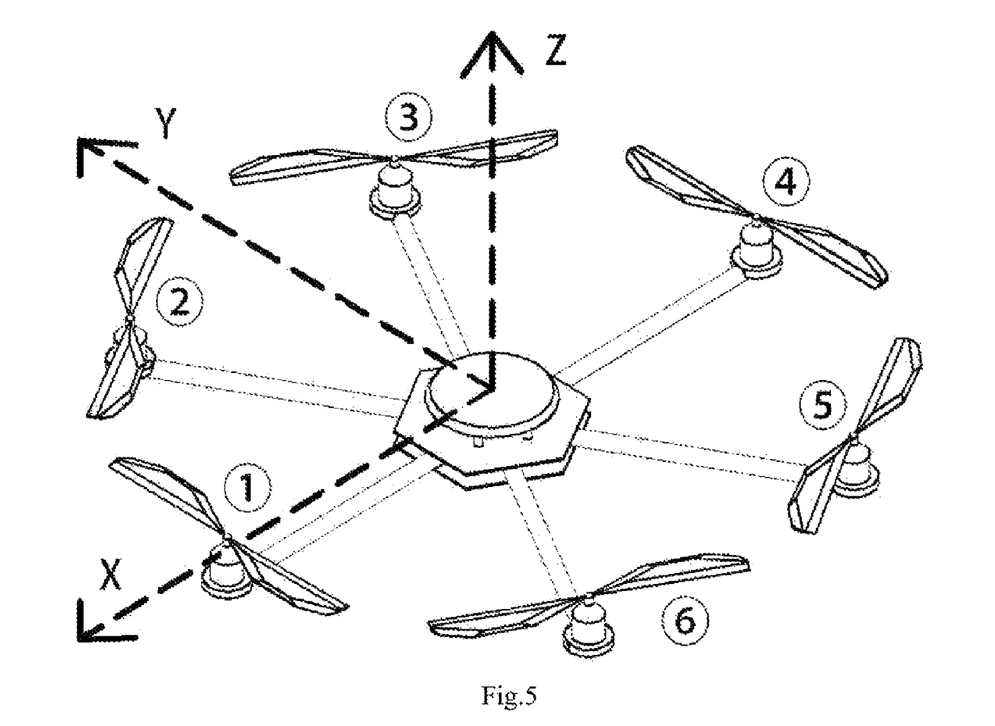
FIG. 5 is a diagram showing a fuselage coordinate system of the multi-rotor aircraft.

The definition of aircraft attitude variables is shown in FIG. 5.

The multi-rotor aircraft in FIG. 5 is defined as follows based on the fuselage coordinate system:

(1) six motors of the six-rotor aircraft are defined No. 1 to No. 6 in the clockwise direction;

(2) X axis extends in the direction of No. 1 rotor arm and points to the forward direction of the aircraft through the center of gravity of the fuselage;

(3) Y axis extends in the direction of the axis of symmetry of No. 2 and No. 3 rotor arms and points to the right motion direction of the aircraft through the center of gravity of the fuselage;

(4) Z axis extends upwardly perpendicular to the plane of six rotors and points to the climbing direction of the aircraft through the center of gravity of the fuselage;

(5) the pitch angle θ is an angle between the X axis of the fuselage and the horizontal plane, and is set to be positive when the fuselage is downward;

(6) the roll angle φ is an angle between the Z axis of the fuselage and the vertical plane passing through the X axis of the fuselage, and is set to be positive when the fuselage is rightward; and (7) the yaw angle ψ is an angle between the projection of the X axis of the fuselage on the horizontal plane and the X axis of a geodetic coordinate system, and is set to be positive when the head of the aircraft is leftward.

According to different rotor-type aircraft models, physical model equations and dynamics equations for the aircraft are established, and dynamics analysis may be completed by means of the following aircraft dynamics modeling steps:

defining a ground coordinate system E and a fuselage coordinate system B, and establishing a relationship E=RB between the ground coordinate system and the fuselage coordinate system by means of a transformation matrix R, where R may be expressed as $$R = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

where φ is a roll angle, θ is a pitch angle, and ψ is a yaw angle;

ignoring the effect of an air resistance on the aircraft, the stress analysis (in the form of Newton-Euler) of the aircraft system in the fuselage coordinate system is as follows $$\begin{bmatrix} mI_{3\times3} & 0 \\ 0 & I \end{bmatrix} \begin{bmatrix} \dot{V} \\ \dot{\omega} \end{bmatrix} + \begin{bmatrix} \omega \times mV \\ \omega \times I\omega \end{bmatrix} = \begin{bmatrix} F \\ \tau \end{bmatrix}$$

where m is the total mass of the aircraft, $I_{3\times3}$ is a unit matrix, I is an inertia matrix, V is a linear velocity in the fuselage coordinate system, ω is an angular velocity in the fuselage coordinate system, F is a resultant external force, and τ is a resultant torque.

According to the above equation, the dynamics equations of the aircraft can be obtained as follows $$\begin{cases} \ddot{x} = \dfrac{u_x u_1}{m} \\ \ddot{y} = \dfrac{u_y u_1}{m} \\ \ddot{z} = -g + \dfrac{(\cos\phi\cos\theta)u_1}{m} \\ \ddot{\phi} = \dfrac{(I_y - I_z)\dot{\theta}\dot{\psi} + lu_2}{I_x} \\ \ddot{\theta} = \dfrac{(I_z - I_x)\dot{\psi}\dot{\phi} + lu_3}{I_y} \\ \ddot{\psi} = \dfrac{(I_x - I_y)\dot{\phi}\dot{\theta} + u_4}{I_z} \end{cases}$$

where l is an arm length; g is a gravitational acceleration; x, y, z are respectively position coordinates of the aircraft in the ground coordinate system; $I_x$, $I_y$, $I_z$ are respectively rotational inertia of the aircraft in X, Y and Z axes; $u_x$=cos φ sin θ cos ψ+sin φ sin ψ; $u_y$=cos φ sin θ sin ψ−sin φ cos ψ; and $u_1$, $u_2$, $u_3$, $u_4$ are output control quantities.

S2: designing a controller of the unmanned aircraft according to a multi-layer zeroing neurodynamic method;

A deviation function regarding the output control quantity $u_1$ is designed from the vertical altitude z, an altitude controller of the multi-rotor unmanned aircraft is designed according to this deviation function, $u_1$ is solved; a deviation function regarding $u_x$ and $u_y$ and a corresponding position controller for the multi-rotor unmanned aircraft are designed from the horizontal positions x and y, and target attitude angles $\phi_T$ and $\theta_T$ are inversely solved; and a deviation function regarding the output control quantities $u_2$~$u_4$ is designed from the roll angle φ, the pitch angle θ and the yaw angle ψ according to the target attitude angles, and a corresponding multi-layer zeroing neural network controller is designed. The specific steps are as follows:

for the vertical altitude z, according to the target altitude value $z_T$ and the actual altitude value z in the Z axis, a deviation function may be defined as $$e_{z1} = z - z_T \tag{1}$$

and its derivative may be obtained as follows $$\dot{e}_{z1} = \dot{z} - \dot{z}_T \tag{2}$$

in order to converge the actual value z to the target value $z_T$, according to the multi-layer zeroing neurodynamic method, a neurodynamic equation based on the deviation function may be designed as $$\dot{e}_{z1} = -\gamma e_{z1} \tag{3}$$

where γ is a constant;

equations (1) and (2) are substituted into equation (3) and collating is performed to obtain $$\dot{z} - \dot{z}_T + \gamma(z - z_T) = 0 \tag{4}$$

since equation (4) is generally not established in the initial situation and does not contain relevant information of the output control quantities, and the control quantities cannot be solved, a further design is needed, and a definition is then made $$e_{z2} = \dot{z} - \dot{z}_T + \gamma(z - z_T) \tag{5}$$

and its derivative may be obtained as follows $$\dot{e}_{z2} = \ddot{z} - \ddot{z}_T + \gamma(\dot{z} - \dot{z}_T) \tag{6}$$

according to the multi-layer zeroing neurodynamic method, a neurodynamic equation based on the deviation function may be designed as $$\dot{e}_{z2} = -\gamma e_{z2} \tag{7}$$

equations (5) and (6) are substituted into equation (7) and collating is performed to obtain $$\ddot{z}-\ddot{z}_T+2\gamma(\dot{z}-\dot{z}_T)+\gamma^2(z-z_T)=0 \qquad (8)$$

in this way, a deviation function may be defined as $$E_z=\ddot{z}-\ddot{z}_T+2\gamma(\dot{z}-\dot{z}_T)+\gamma^2(z-z_T) \qquad (9)$$

according to the dynamics equations of the aircraft, (9) may be simplified into $$E_z=a_zu_1+b_z \qquad (10)$$

where $$a_z=\frac{\cos\phi\cos\theta}{m},$$

and $b_z=-g-\ddot{z}_T+2\gamma(\dot{z}-\dot{z}_T)+\gamma^2(z-z_T)$; and its derivative may be obtained as follows $$\dot{E}_z=a_z\dot{u}_1+\dot{a}_zu_1+\dot{b}_z \qquad (11)$$

it is possible to use the multi-layer zeroing neurodynamic method to design $$\dot{E}_z=-\gamma E_z \qquad (12)$$

equations (10) and (11) are substituted into equation (12) and collating is performed to obtain $$a_z\dot{u}_1=-\gamma(a_zu_1+b_z)-\dot{b}_z-\dot{a}_zu_1 \qquad (13).$$

for the horizontal position x, according to the target value $x_T$ and the actual value x in the X axis, a deviation function may be defined as $$e_{x1}=x-x_T \qquad (14)$$

and its derivative may be obtained as follows $$\dot{e}_{x1}=\dot{x}-\dot{x}_T \qquad (15)$$

in order to converge the actual value x to the target value $x_T$, according to the multi-layer zeroing neurodynamic method, a neurodynamic equation based on the deviation function may be designed as $$\dot{e}_{x1}=-\gamma e_{x1} \qquad (16)$$

equations (14) and (15) are substituted into equation (16) and collating is performed to obtain $$\dot{x}-\dot{x}_T+\gamma(x-x_T)=0 \qquad (17)$$

since equation (17) is generally not established in the initial situation and does not contain relevant information of the output control quantities, and the control quantities cannot be solved, a further design is needed, and a definition is then made $$e_{x2}=\dot{x}-\dot{x}_T+\gamma(x-x_T) \qquad (18)$$

and its derivative may be obtained as follows $$\dot{e}_{x2}=\ddot{x}-\ddot{x}_T+\gamma(\dot{x}-\dot{x}_T) \qquad (19)$$

according to the multi-layer zeroing neurodynamic method, a neurodynamic equation based on the deviation function may be designed as $$\dot{e}_{x2}=-\gamma e_{x2} \qquad (20)$$

equations (18) and (19) are substituted into equation (20) and collating is performed to obtain $$\ddot{x}-\ddot{x}_T+2\gamma(\dot{x}-\dot{x}_T)+\gamma^2(x-x_T)=0 \qquad (21)$$

in this way, a deviation function may be defined as $$E_x=\ddot{x}-\ddot{x}_T+2\gamma(\dot{x}-\dot{x}_T)+\gamma^2(x-x_T) \qquad (22)$$

according to the dynamics equations of the aircraft, equation (22) may be simplified into $$E_x=a_xu_x+b_x \qquad (23)$$

where $$a_x=\frac{u_1}{m},$$

and $b_x=-\ddot{x}_T+2\gamma(\dot{x}-\dot{x}_T)+\gamma^2(x-x_T)$; and its derivative may be obtained as follows $$\dot{E}_x=a_x\dot{u}_x+\dot{a}_xu_x+\dot{b}_x \qquad (24)$$

it is possible to use the multi-layer zeroing neurodynamic method to design $$\dot{E}_x=-\gamma E_x \qquad (25)$$

equations (23) and (24) are substituted into equation (25) and collating is performed to obtain $$a_x\dot{u}_x=-\gamma(a_xu_x+b_x)-\dot{b}_x-\dot{a}_xu_x \qquad (26)$$

for the horizontal position y, according to the target value $y_T$ and the actual value y in the Y axis, a deviation function may be defined as $$e_{y1}=y-y_T \qquad (27)$$

and its derivative may be obtained as follows $$\dot{e}_{y1}=\dot{y}-\dot{y}_T \qquad (28)$$

in order to converge the actual value y to the target value $y_T$, according to the multi-layer zeroing neurodynamic method, a neurodynamic equation based on the deviation function may be designed as $$\dot{e}_{y1}=-\gamma e_{y1} \qquad (29)$$

equations (27) and (28) are substituted into equation (29) and collating is performed to obtain $$\dot{y}-\dot{y}_T+\gamma(y-y_T)=0 \qquad (30)$$

since equation (30) is generally not established in the initial situation and does not contain relevant information of the output control quantities, and the control quantities cannot be solved, a further design is needed, and a definition is then made $$e_{y2}=\dot{y}-\dot{y}_T+\gamma(y-y_T) \qquad (31)$$

and its derivative may be obtained as follows $$\dot{e}_{y2}=\ddot{y}-\ddot{y}_T+\gamma(\dot{y}-\dot{y}_T) \qquad (32)$$

according to the multi-layer zeroing neurodynamic method, a neurodynamic equation based on the deviation function may be designed as $$\dot{e}_{y2}=-\gamma e_{y2} \qquad (33)$$

equations (31) and (32) are substituted into equation (33) and collating is performed to obtain $$\ddot{y}-\ddot{y}_T+2\gamma(\dot{y}-\dot{y}_T)+\gamma^2(y-y_T)=0 \qquad (34)$$

in this way, a deviation function may be defined as $$E_y=\ddot{y}-\ddot{y}_T+2\gamma(\dot{y}-\dot{y}_T)+\gamma^2(y-y_T) \qquad (35)$$

according to the dynamics equations of the aircraft, equation (35) may be simplified into $$E_y=a_yu_y+b_y \qquad (36)$$

where $$a_y = \frac{u_1}{m},$$

$b_y = -\ddot{y}_T + 2\gamma(\dot{y}-\dot{y}_T) + \gamma^2 (y-y_T)$; and its derivative may be obtained as follows $$\dot{E}_y = a_y \dot{u}_y + \dot{a}_y u_y + \dot{b}_y \qquad (37)$$

it is possible to use the multi-layer zeroing neurodynamic method to design $$\dot{E}_y = -\gamma E_y \qquad (38)$$

equations (36) and (37) are substituted into equation (38) and collating is performed to obtain $$a_y \dot{u}_y = -\gamma(a_y u_y + b_y) - \dot{b}_y - \dot{a}_y u_y \qquad (39)$$

$u_x$ and $u_y$ may be solved from equations (26) and (39), $$\begin{cases} u_x = \cos\phi\sin\theta\cos\psi + \sin\phi\sin\psi \\ u_y = \cos\phi\sin\theta\sin\psi - \sin\phi\cos\psi \end{cases}$$

so that the inversely solved target angle values $\phi_T$ and $\theta_T$ may be $$\begin{cases} \phi_T = \sin^{-1}(u_x \sin\psi - u_y \cos\psi) \\ \theta_T = \sin^{-1}\left(\dfrac{u_x - \sin\phi_T \sin\psi}{\cos\phi_T \cos\psi}\right) \end{cases} \qquad (40)$$

for the roll angle $\phi$, according to the target angle $\phi_T$ solved in (40) and the actual angle $\phi$, a deviation function may be defined as $$e_{\phi 1} = \phi - \phi_T \qquad (41)$$

and its derivative may be obtained as follows $$\dot{e}_{\phi 1} = \dot{\phi} - \dot{\phi}_T \qquad (42)$$

in order to converge the actual value $\phi$ to the target value $\phi_T$, according to the multi-layer zeroing neurodynamic method, a neurodynamic equation based on the deviation function may be designed as $$\dot{e}_{\phi 1} = -\gamma e_{\phi 1} \qquad (43)$$

equations (41) and (42) are substituted into equation (43) and collating is performed to obtain $$\dot{\phi} - \dot{\phi}_T + \gamma(\phi - \phi_T) = 0 \qquad (44)$$

since equation (44) is generally not established in the initial situation and does not contain relevant information of the output control quantities, and the control quantities cannot be solved, a further design is needed, and a definition is then made $$e_{\phi 2} = \dot{\phi} - \dot{\phi}_T + \gamma(\phi - \phi_T) \qquad (45)$$

and its derivative may be obtained as follows $$\dot{e}_{\phi 2} = \ddot{\phi} - \ddot{\phi}_T + \gamma(\dot{\phi} - \dot{\phi}_T) \qquad (46)$$

according to the multi-layer zeroing neurodynamic method, a neurodynamic equation based on the deviation function may be designed as $$\dot{e}_{\phi 2} = -\gamma e_{\phi 2} \qquad (47)$$

equations (45) and (46) are substituted into equation (47) and collating is performed to obtain $$\ddot{\phi} - \ddot{\phi}_T + 2\gamma(\dot{\phi} - \dot{\phi}_T) + \gamma^2(\phi - \phi_T) = 0 \qquad (48)$$

in this way, a deviation function may be defined as $$E_\phi = \ddot{\phi} - \ddot{\phi}_T + 2\gamma(\dot{\phi} - \dot{\phi}_T) + \gamma^2(\phi - \phi_T) \qquad (49)$$

according to the dynamics equations of the aircraft, equation (49) may be simplified into $$E_\phi = a_\phi u_2 + b_\phi \qquad (50)$$

where $$a_\phi = \frac{l}{I_x}, \text{ and } b_\phi = \frac{(I_y - I_z)\dot{\theta}\dot{\psi}}{I_x} - \ddot{\phi}_T + 2\gamma(\dot{\phi} - \dot{\phi}_T) + \gamma^2(\phi - \phi_T);$$

and its derivative may be obtained as follows $$\dot{E}_\phi = a_\phi \dot{u}_2 + \dot{a}_\phi u_2 + \dot{b}_\phi \qquad (51)$$

according to the multi-layer zeroing neurodynamic method, it is possible to design $$\dot{E}_\phi = \gamma E_\phi \qquad (52)$$

equations (50) and (51) are substituted into equation (52) and collating is performed to obtain $$a_\phi \dot{u}_2 = -\gamma(a_\phi u_2 + b_\phi) - \dot{b}_\phi - \dot{a}_\phi u_2 \qquad (53)$$

for the pitch angle $\theta$, according to the target angle $\theta_T$ solved in (40) and the actual angle $\theta$, a deviation function may be defined as $$e_{\theta 1} = \theta - \theta_T \qquad (54)$$

and its derivative may be obtained as follows $$\dot{e}_{\theta 1} = \dot{\theta} - \dot{\theta}_T \qquad (55)$$

in order to converge the actual value $\theta$ to the target value $\theta_T$, according to the multi-layer zeroing neurodynamic method, a neurodynamic equation based on the deviation function may be designed as $$\dot{e}_{\theta 1} = -\gamma e_{\theta 1} \qquad (56)$$

equations (54) and (55) are substituted into equation (56) and collating is performed to obtain $$\dot{\theta} - \dot{\theta}_T + \gamma(\theta - \theta_T) = 0 \qquad (57)$$

since equation (57) is generally not established in the initial situation and does not contain relevant information of the output control quantities, and the control quantities cannot be solved, a further design is needed, and a definition is then made $$e_{\theta 2} = \dot{\theta} - \dot{\theta}_T + \gamma(\theta - \theta_T) \qquad (58)$$

and its derivative may be obtained as follows $$\dot{e}_{\theta 2} = \ddot{\theta} - \ddot{\theta}_T + \gamma(\dot{\theta} - \dot{\theta}_T) \qquad (59)$$

according to the multi-layer zeroing neurodynamic method, a neurodynamic equation based on the deviation function may be designed as $$\dot{e}_{\theta 2} = -\gamma e_{\theta 2} \qquad (60)$$

equations (58) and (59) are substituted into equation (60) and collating is performed to obtain $$\ddot{\theta} - \ddot{\theta}_T + 2\gamma(\dot{\theta} - \dot{\theta}_T) + \gamma^2(\theta - \theta_T) = 0 \qquad (61)$$

in this way, a deviation function may be defined as $$E_\theta = \ddot{\theta} - \ddot{\theta}_T + 2\gamma(\dot{\theta} - \dot{\theta}_T) + \gamma^2(\theta - \theta_T) \qquad (62)$$

according to the dynamics equations of the aircraft, equation (62) may be simplified into $$E_\theta = a_\theta u_3 + b_\theta \qquad (63)$$

where $$a_\theta = \frac{1}{I_y}, \text{ and } b_\theta = \frac{(I_z - I_x)\dot\phi\dot\psi}{I_y} - \ddot\theta_T + 2\gamma(\dot\theta - \dot\theta_T) + \gamma^2(\theta - \theta_T);$$

and its derivative may be obtained as follows $$\dot E_\theta = a_\theta \dot u_3 + \dot b_\theta \quad (64)$$

according to the multi-layer zeroing neurodynamic method, it is possible to design $$\dot E_\theta = -\gamma E_\theta \quad (65)$$

equations (63) and (64) are substituted into equation (65) and collating is performed to obtain $$a_\theta \dot u_3 = -\gamma(a_\theta u_3 + b_\theta) - \dot b_\theta - \dot a_\theta u_3 \quad (66)$$

for the yaw angle ψ, according to the target angle $\psi_T$ solved in (40) and the actual angle ψ, a deviation function may be defined as $$e_{\psi 1} = \psi - \psi_T \quad (67)$$

and its derivative may be obtained as follows $$\dot e_{\psi 1} = \dot\psi - \dot\psi_T \quad (68)$$

in order to converge the actual value ψ to the target value $\psi_T$, according to the multi-layer zeroing neurodynamic method, a neurodynamic equation based on the deviation function may be designed as $$\dot e_{\psi 1} = -\gamma e_{\psi 1} \quad (69)$$

equations (67) and (68) are substituted into equation (69) and collating is performed to obtain $$\dot\psi - \dot\psi_T + \gamma(\psi - \psi_T) = 0 \quad (70)$$

since equation (70) is generally not established in the initial situation and does not contain relevant information of the output control quantities, and the control quantities cannot be solved, a further design is needed, and a definition is then made $$e_{\psi 2} = \dot\psi - \dot\psi_T + \gamma(\psi - \psi_T) \quad (71)$$

and its derivative may be obtained as follows $$\dot e_{\psi 2} = \ddot\psi - \ddot\psi_T + \gamma(\dot\psi - \dot\psi_T) \quad (72)$$

according to the multi-layer zeroing neurodynamic method, a neurodynamic equation based on the deviation function may be designed as $$\dot e_{\psi 2} = -\gamma e_{\psi 2} \quad (73)$$

equations (71) and (72) are substituted into equation (73) and collating is performed to obtain $$\ddot\psi - \ddot\psi_T + 2\gamma(\dot\psi - \dot\psi_T) + \gamma^2(\psi - \psi_T) = 0 \quad (74)$$

in this way, a deviation function may be defined as $$E_\psi = \ddot\psi - \ddot\psi_T + 2\gamma(\dot\psi - \dot\psi_T) + \gamma^2(\psi - \psi_T) \quad (75)$$

according to the dynamics equations of the aircraft, equation (75) may be simplified into $$E_\psi = a_\psi u_4 + b_\psi \quad (76)$$

where $$a_\psi = \frac{1}{I_z}, \text{ and } b_\psi = \frac{(I_x - I_y)\dot\phi\dot\theta}{I_z} - \ddot\psi_T + 2\gamma(\dot\psi - \dot\psi_T) + \gamma^2(\psi - \psi_T);$$

and its derivative may be obtained as follows $$\dot E_\psi = a_\psi \dot u_4 + \dot a_\psi u_4 + \dot b_\psi \quad (77)$$

according to the multi-layer zeroing neurodynamic method, it is possible to design $$\dot E_\psi = -\gamma E_\psi \quad (78)$$

equations (76) and (77) are substituted into equation (78) and collating is performed to obtain $$a_\psi \dot u_4 = -\gamma(a_\psi u_4 + b_\psi) - \dot b_\psi - \dot a_\psi u_4 \quad (79).$$

S3: solving output control quantities of motors of the aircraft by the designed multi-layer zeroing neural network controller using the acquired real-time operation data of the aircraft and target attitude data; and A controller of the unmanned aircraft may be obtained according to multi-layer zeroing neural network equations (13), (53), (66) and (79), wherein the controller can be implemented by a network structure; the controller of the unmanned aircraft is capable of controlling the stable flight of the unmanned aircraft; and the controller may be written in the following form:

$$\begin{cases} \dot u_1 = \dfrac{-\gamma(a_z u_1 + b_z) - \dot b_z - \dot a_z u_1}{a_z} \\ \dot u_2 = \dfrac{-\gamma(a_\phi u_2 + b_\phi) - \dot b_\phi - \dot a_\phi u_2}{a_\phi} \\ \dot u_3 = \dfrac{-\gamma(a_\theta u_3 + b_\theta) - \dot b_\theta - \dot a_\theta u_3}{a_\theta} \\ \dot u_4 = \dfrac{-\gamma(a_\psi u_4 + b_\psi) - \dot b_\psi - \dot a_\psi u_4}{a_\psi} \end{cases}$$

a zeroing neural network is constructed from the differential equations of the controller, and the control quantities of the unmanned aircraft are solved by means of the zeroing neural network.

S4: transferring solution results of step S3 to a motor governor of the aircraft, and controlling powers of the motors according to a relationship between the control quantities solved by the controller and the powers of the motors of the multi-rotor unmanned aircraft, so as to control the motion of the unmanned aircraft;

according to a power allocation scheme for the unmanned aircraft, the control quantities solved by the controller have the following relationship with the powers of the motors of the multi-rotor unmanned aircraft:

$$U = WF$$

where U=[$u_1$ $u_2$ $u_3$ $u_4$]T refers to the control quantities of the unmanned aircraft, F=[$F_1$ ... $F_j$]$^T$ refers to the powers of the motors of the unmanned aircraft, j is the number of the motors of the multi-rotor unmanned aircraft, and W is a power allocation matrix of the unmanned aircraft.

In order to obtain the power required by the corresponding motor, the corresponding powers of the motors F may be obtained by means of matrix inversion or pseudo-inversion, i.e.

$$F = W^{-1} U$$

if the matrix W is a square matrix and is reversible, $W^{-1}$ is obtained by means of an inverse operation, and if W is not a square matrix, $W^{-1}$ is solved by means of a corresponding pseudo-inverse operation; and the desired powers F of the motors are finally obtained, input voltages of the motors are controlled according to a relationship between the voltages and powers of the motors to control the rotational speeds of the motors, and the control over the powers of the motors is finally realized to complete stable flight control over the unmanned aircraft. Since different numbers and structures of the rotors affect the control mode of the multi-rotor unmanned aircraft, the matrix W has different forms depending on the structure and the number of the rotors.

Taking the six-rotor unmanned aircraft as an example, the power allocation thereof has the following relationship:

$$\begin{cases} u_1 = F_1 + F_2 + F_3 + F_4 + F_5 + F_6 \\ u_2 = F_2 + F_3 - F_5 - F_6 \\ u_3 = F_1 - F_4 \\ u_4 = -F_1 - F_3 - F_5 + F_2 + F_4 + F_6 \end{cases}$$

The relationship may be further written as $$\begin{bmatrix} u_1 \\ u_2 \\ u_3 \\ u_4 \end{bmatrix} = \begin{bmatrix} 1 & 1 & 1 & 1 & 1 & 1 \\ 0 & 1 & 1 & 0 & -1 & -1 \\ 1 & 0 & 0 & -1 & 0 & 0 \\ -1 & 1 & -1 & 1 & -1 & 1 \end{bmatrix} \begin{bmatrix} F_1 \\ F_2 \\ F_3 \\ F_4 \\ F_5 \\ F_6 \end{bmatrix}$$

Since W is not a square matrix in the above relationship, $W^{-1}$ may be obtained by means of pseudo-inversion, i.e.

$$w^{-1} = \begin{bmatrix} 0.1667 & 0 & 0.5 & 0 \\ 0.1667 & 0.25 & 0.25 & 0.25 \\ 0.1667 & 0.25 & -0.25 & -0.25 \\ 0.1667 & 0 & -0.5 & 0 \\ 0.1667 & -0.25 & -0.25 & -0.25 \\ 0.1667 & -0.25 & 0.25 & 0.25 \end{bmatrix}$$

In this way, the power allocation of the six-rotor unmanned aircraft and the corresponding actual motor control quantity may be obtained to control the operation of the motor.

The foregoing description is merely illustrative of preferred embodiments of the present invention, but the scope of protection of the present invention is not limited thereto. Equivalent replacements or modifications made to the inventive concept or technical solution of the present invention by a person skilled in the art within the scope of the disclosure of the present invention fall into the scope of protection of the present invention.

The invention claimed is:

1. A method for controlling stable flight of an unmanned aircraft, characterized by comprising the steps of:
   1) acquiring real-time flight operation data of the aircraft itself, analyzing a kinematic problem of the aircraft, and establishing a dynamics model of the aircraft;
   2) constructing a deviation function according to the real-time flight operation data acquired in step 1) and target attitude data, and constructing neurodynamic equations based on the deviation function by using a multi-layer zeroing neurodynamic method, wherein the neurodynamic equations based on the deviation function corresponding to all parameters together constitute a controller of the unmanned aircraft, and output quantities solved from differential equations of the controller are output control quantities of motors of the aircraft; and
   3) controlling powers of the motors according to a relationship between the output control quantities solved in step 2) and the powers of the motors of the unmanned aircraft to complete motion control over the unmanned aircraft, specifically:
   according to a power allocation scheme for the unmanned aircraft, the control quantities solved by the controller have the following relationship with the powers of the motors of the unmanned aircraft:

$U=WF$ where $U=[u_1\ u_2\ u_3\ u_4]^T$ refers to the output control quantities of the unmanned aircraft, $F=[F_1\ \ldots\ F_j]^T$ refers to the powers of the motors of the unmanned aircraft, j is the number of the motors of the unmanned aircraft, W is a power allocation matrix of the unmanned aircraft, and the matrix W has different forms depending on different structures and the number of rotors, and needs to be determined according to the structure thereof and the number of the rotors;
   the corresponding powers F of the motors are obtained by means of matrix inversion or pseudo-inversion:

$F=W^{-1}U$ if the matrix W is a square matrix and is reversible, $W^{-1}$ is obtained by means of an inverse operation, and if W is not a square matrix, $W^{-1}$ is solved by means of a corresponding pseudo-inverse operation; and the desired powers F of the motors are finally obtained, input voltages of the motors are controlled according to a relationship between the voltages and powers of the motors to control the rotational speeds of the motors, and the control over the powers of the motors is finally realized to complete stable flight control over the unmanned aircraft.

2. The method for controlling stable flight of an unmanned aircraft according to claim 1, further including providing a processor mounted to the unmanned aircraft and wherein analyzing the kinematic problem, in step 1), compromises:
defining a ground coordinate system E and a fuselage coordinate system B, and establishing a relationship $E=RB$ between the ground coordinate system and the fuselage coordinate system by means of a transformation matrix R, where R is expressed as $$R = \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix}$$

where $\phi$ is a roll angle, $\theta$ is a pitch angle, and $\psi$ is a yaw angle;
ignoring the effect of an air resistance on the aircraft, a stress analysis of an aircraft system in the fuselage coordinate system is as follows $$\begin{bmatrix} mI_{3\times 3} & 0 \\ 0 & I \end{bmatrix} \begin{bmatrix} \dot{V} \\ \dot{\omega} \end{bmatrix} + \begin{bmatrix} \omega \times mV \\ \omega \times I\omega \end{bmatrix} = \begin{bmatrix} F \\ \tau \end{bmatrix}$$

where m is the total mass of the aircraft, $I_{3\times 3}$ is a unit matrix, I is an inertia matrix, V is a linear velocity in the fuselage coordinate system, ω is an angular velocity in the fuselage coordinate system, F is a resultant external force, and r is a resultant torque.

3. The method for controlling stable flight of an unmanned aircraft according to claim 2, characterized in that the step of establishing a dynamics model of the aircraft specifically comprises:

according to the defined ground coordinate system E and fuselage coordinate system B, the relationship E=RB established between the two by means of the transformation matrix R and the stress analysis of the aircraft system in the fuselage coordinate system, obtaining dynamics equations of the aircraft as follows $$\begin{cases} \ddot{x} = \dfrac{u_x u_1}{m} \\ \ddot{y} = \dfrac{u_y u_1}{m} \\ \ddot{z} = -g + \dfrac{(\cos\phi \cos\theta) u_1}{m} \\ \ddot{\phi} = \dfrac{(I_y - I_z)\dot{\theta}\dot{\psi} + l u_2}{I_x} \\ \ddot{\theta} = \dfrac{(I_z - I_x)\dot{\psi}\dot{\phi} + l u_3}{I_y} \\ \ddot{\psi} = \dfrac{(I_x - I_y)\dot{\phi}\dot{\theta} + u_4}{I_z} \end{cases}$$

where l is an arm length; g is a gravitational acceleration; x, y, z are respectively position coordinates of the aircraft in the ground coordinate system; $\ddot{x}$, $\ddot{y}$, $\ddot{z}$ respectively represent second derivatives of x(t), y(t) and z(t); ϕ, θ and ψ respectively represent a roll angle, a pitch angle and a yaw angle; $\ddot{\phi}$, $\ddot{\theta}$ and $\ddot{\psi}$ respectively represent second derivatives of the corresponding parameters; $\dot{\phi}$, $\dot{\theta}$, $\dot{\psi}$ respectively represent first derivatives of the corresponding parameters; $I_x$, $I_y$, $I_z$ are respectively rotational inertia of the aircraft in X, Y and Z axes; $u_x$=cos ϕ sin θ cos ψ+sin ϕ sin ψ; $u_y$=cos ϕ sin θ sin ψ−sin ϕ cos ψ; and $u_1$, $u_2$, $u_3$, $u_4$ are output control quantities.

4. The method for controlling stable flight of an unmanned aircraft according to claim 1, characterized in that a step of designing the controller of the unmanned aircraft according to a multi-layer zeroing neurodynamic method specifically comprises the steps of:

(2-1) designing a deviation function regarding the output control quantity $u_1$ from a vertical altitude z by means of the multi-layer zeroing neurodynamic method, and designing an altitude controller for the unmanned aircraft according to this deviation function;

(2-2) designing a deviation function regarding $u_x$ and $u_y$ from the horizontal positions x and y by means of the multi-layer zeroing neurodynamic method, designing a position controller for the unmanned aircraft according to this deviation function, and then inversely solving target attitude angles $\phi_T$ and $\theta_T$; and (2-3) designing a deviation function regarding the output control quantities $u_2$~$u_4$ from a roll angle ϕ, a pitch angle θ and a yaw angle ψ by means of the multi-layer zeroing neurodynamic method, and designing an attitude controller according to this deviation function.

5. The method for controlling stable flight of an unmanned aircraft according to claim 4, characterized in that the step of designing a deviation function regarding the output control quantity $u_1$ from the vertical altitude z by means of the multi-layer zeroing neurodynamic method, and designing an altitude controller for the unmanned aircraft according to this deviation function specifically comprises:

for the vertical altitude z, according to the target altitude value $z_T$ and the actual altitude value z in the Z axis, defining a deviation function as $$E_z = \ddot{z} - \ddot{z}_T + 2\gamma(\dot{z} - \dot{z}_T) + \gamma^2(z - z_T) \tag{9}$$

according to the dynamics equations of the aircraft, simplifying (9) into $$E_z = a_z u_1 + b_z \tag{10}$$

where $$a_z = \frac{\cos\phi \cos\theta}{m}, \quad b_z = -g - \ddot{z}_T + 2\gamma(\dot{z} - \dot{z}_T) + \gamma^2(z - z_T),$$

and γ is a constant; and obtaining its derivative as follows $$\dot{E}_z = a_z \dot{u}_1 + \dot{a}_z u_1 + \dot{b}_z \tag{11}$$

using the multi-layer zeroing neurodynamic method to design $$\dot{E}_z = -\gamma E_z \tag{12}$$

substituting equations (10) and (11) into equation (12) and perform collating to obtain $$a_z \dot{u}_1 = -\gamma(a_z u_1 + b_z) - \dot{b}_z - \dot{a}_z u_1 \tag{13}.$$

6. The method for controlling stable flight of an unmanned aircraft according to claim 4, characterized in that the step of designing a deviation function regarding $u_x$ and $u_y$, and a position controller for the unmanned aircraft specifically comprises:

for the horizontal position x, according to the target value $x_T$ and the actual value x in the X axis, defining a deviation function as $$E_x = \ddot{x} - \ddot{x}_T + 2\gamma(\dot{x} - \dot{x}_T) + \gamma^2(x - x_T) \tag{22}$$

according to the dynamics equations of the aircraft, simplifying equation (22) into
where $$a_x = \frac{u_1}{m},$$

and $b_x = -\ddot{x}_T + 2\gamma(\dot{x} - \dot{x}_T) + \gamma^2(x - x_T)$; and obtaining its derivative as follows $$\dot{E}_x = a_x \dot{u}_x + \dot{a}_x u_x + \dot{b}_x \tag{24}$$

using the multi-layer zeroing neurodynamic method to design $$\dot{E}_x = -\gamma E_x \tag{25}$$

substituting equations (23) and (24) into equation (25) and perform collating to obtain $$a_x \dot{u}_x = -\gamma(a_x u_x + b_x) - \dot{b}_x - \dot{a}_x u_x \tag{26}$$

for the horizontal position y, according to the target value $y_T$ and the actual value y in the Y axis, defining a deviation function as $$E_y = \ddot{y} - \ddot{y}_T + 2\gamma(\dot{y} - \dot{y}_T) + \gamma^2(y - y_T) \tag{35}$$

according to the dynamics equations of the aircraft, simplifying equation (35) into
where $$E_y = a_y u_y + b_y \quad (36)$$

$$a_y = \frac{u_1}{m},$$

and $b_y = -\ddot{y}_T + 2\gamma(\dot{y} - \dot{y}_T) + \gamma^2 (y - y_T)$; and obtaining its derivative as follows $$\dot{E}_y = a_y \dot{u}_y + \dot{a}_y u_y + \dot{b}_y \quad (37)$$

using the multi-layer zeroing neurodynamic method to design $$\dot{E}_y = -\gamma E_y \quad (38)$$

substituting equations (36) and (37) into equation (38) and perform collating to obtain $$a_y \dot{u}_y = -\gamma(a_y u_y + b_y) - \dot{b}_y - \dot{a}_y u_y \quad (39).$$

7. The method for controlling stable flight of an unmanned aircraft according to claim 6, characterized in that the calculation formulas of inversely solving the target attitude angles $\phi_T$ and $\theta_T$ are:
$u_x$ and $u_y$ solved from position controller equations (26) and (39) are $$\begin{cases} u_x = \cos\phi \sin\theta \cos\psi + \sin\phi \sin\psi \\ u_y = \cos\phi \sin\theta \sin\psi - \sin\phi \cos\psi \end{cases}$$

so that the inversely solved target angle values $\phi_T$ and $\theta_T$ are $$\begin{cases} \phi_T = \sin^{-1}(u_x \sin\psi - u_y \cos\psi) \\ \theta_T = \sin^{-1}\left(\frac{u_x - \sin\phi_T \sin\psi}{\cos\phi_T \cos\psi}\right) \end{cases} \quad (40)$$

8. The method for controlling stable flight of an unmanned aircraft according to claim 7, characterized in that the step of designing a deviation function regarding the output control quantities $u_2 \sim u_4$ from the roll angle $\phi$, the pitch angle $\theta$ and the yaw angle $\psi$ by means of the multi-layer zeroing neurodynamic method, and designing an attitude controller according to this deviation function specifically comprises:
for the roll angle $\phi$, according to a target angle $\phi_T$ solved in (40) and the actual angle $\phi$, defining a deviation function as $$E_\phi = \ddot{\phi} - \ddot{\phi}_T + 2\gamma(\dot{\phi} - \dot{\phi}_T) + \gamma^2(\phi - \phi_T) \quad (49)$$

according to the dynamics equations of the aircraft, simplifying equation (49) into $$E_\phi = a_\phi u_2 + b_\phi \quad (50)$$

where $$a_\phi = \frac{l}{I_x}, \text{ and } b_\phi = \frac{(I_y - I_z)\dot{\theta}\dot{\psi}}{I_x} - \ddot{\phi}_T + 2\gamma(\dot{\phi} - \dot{\phi}_T) + \gamma^2(\phi - \phi_T);$$

and obtaining its derivative as follows $$\dot{E}_\phi = a_\phi \dot{u}_2 + \dot{a}_\phi u_2 + \dot{b}_\phi \quad (51)$$

according to the multi-layer zeroing neurodynamic method, designing $$\dot{E}_\phi = -\gamma E_\phi \quad (52)$$

substituting equations (50) and (51) into equation (52) and perform collating to obtain $$a_\phi \dot{u}_2 = -\gamma(a_\phi u_2 + b_\phi) - \dot{b}_\phi - \dot{a}_\phi u_2 \quad (53)$$

for the pitch angle $\theta$, according to the target angle $\theta_T$ solved in (40) and the actual angle $\theta$, defining a deviation function as $$E_\theta = \ddot{\theta} - \ddot{\theta}_T + 2\gamma(\dot{\theta} - \dot{\theta}_T) + \gamma^2(\theta - \theta_T) \quad (62)$$

according to the dynamics equations of the aircraft, simplifying equation (62) into $$E_\theta = a_\theta u_3 + b_\theta \quad (63)$$

where $$a_\theta = \frac{l}{I_y}, \text{ and } b_\theta = \frac{(I_z - I_x)\dot{\phi}\dot{\psi}}{I_y} - \ddot{\theta}_T + 2\gamma(\dot{\theta} - \dot{\theta}_T) + \gamma^2(\theta - \theta_T);$$

and obtaining its derivative as follows $$\dot{E}_\theta = a_\theta \dot{u}_3 + \dot{a}_\theta u_3 + \dot{b}_\theta \quad (64)$$

according to the multi-layer zeroing neurodynamic method, designing $$\dot{E}_\theta = -\gamma E_\theta \quad (65)$$

substituting equations (63) and (64) into equation (65) and perform collating to obtain $$a_\theta \dot{u}_3 = -\gamma(a_\theta u_3 + b_\theta) - \dot{b}_\theta - \dot{a}_\theta u_3 \quad (66)$$

for the yaw angle $\psi$, according to an artificially set angle $\psi_T$ and the actual angle $\psi$, defining a deviation function as $$E_\psi = \ddot{\psi} - \ddot{\psi}_T + 2\gamma(\dot{\psi} - \dot{\psi}_T) + \gamma^2(\psi - \psi_T) \quad (75)$$

according to the dynamics equations of the aircraft, simplifying equation (75) into $$E_\psi = a_\psi u_4 + b_\psi \quad (76)$$

where $$a_\psi = \frac{1}{I_z}, \text{ and } b_\psi = \frac{(I_x - I_y)\dot{\phi}\dot{\theta}}{I_z} - \ddot{\psi}_T + 2\gamma(\dot{\psi} - \dot{\psi}_T) + \gamma^2(\psi - \psi_T);$$

and obtaining its derivative as follows $$\dot{E}_\psi = a_\psi \dot{u}_4 + \dot{a}_\psi u_4 + \dot{b}_\psi \quad (77)$$

according to the multi-layer zeroing neurodynamic method, designing $$\dot{E}_\psi = -\gamma E_\psi \quad (78)$$

substituting equations (76) and (77) into equation (78) and perform collating to obtain $$a_\psi \dot{u}_4 = -\gamma(a_\psi u_4 + b_\psi) - \dot{b}_\psi - \dot{a}_\psi u_4 \quad (79).$$

9. The method for controlling stable flight of an unmanned aircraft according to claim 4, characterized in that the step in which the designed altitude controller, position controller and attitude controller together constitute a stable aircraft of the unmanned aircraft specifically comprises:

$$a_z \dot{u}_1 = -\gamma(a_z u_1 + b_z) - \dot{b}_z - \dot{a}_z u_1 \quad (13)$$

$$a_\phi \dot{u}_2 = -\gamma(a_\phi u_2 + b_\phi) - \dot{b}_\phi - \dot{a}_\phi u_2 \quad (53)$$

$$a_\theta \dot{u}_3 = -\gamma(a_\theta u_3 + b_\theta) - \dot{b}_\theta - \dot{a}_\theta u_3 \quad (66)$$

$$a_\psi \dot{u}_4 = -\gamma(a_\psi u_4 + b_\psi) - \dot{b}_\psi - \dot{a}_\psi u_4 \quad (79)$$

obtaining a controller of the unmanned aircraft according to equations (13), (53), (66) and (79), wherein the controller can be implemented by a network structure; the controller of the unmanned aircraft is capable of controlling the stable flight of the unmanned aircraft; and the controller is written in the following form:

$$\begin{cases} \dot{u}_1 = \dfrac{-\gamma(a_z u_1 + b_z) - \dot{b}_z - \dot{a}_z u_1}{a_z} \\ \dot{u}_2 = \dfrac{-\gamma(a_\phi u_2 + b_\phi) - \dot{b}_\phi - \dot{a}_\phi u_2}{a_\phi} \\ \dot{u}_3 = \dfrac{-\gamma(a_\theta u_3 + b_\theta) - \dot{b}_\theta - \dot{a}_\theta u_3}{a_\theta} \\ \dot{u}_4 = \dfrac{-\gamma(a_\psi u_4 + b_\psi) - \dot{b}_\psi - \dot{a}_\psi u_4}{a_\psi} \end{cases}$$

a multi-layer zeroing neural network is constructed from the differential equations of the controller, and the control quantities of the unmanned aircraft are solved by means of the multi-layer zeroing neural network.

\* \* \* \* \*